(No Model.)
P. B. DELANY.
MEANS FOR MECHANICALLY CORRECTING THE VIBRATIONS OF REEDS AND FORKS.
No. 322,695. Patented July 21, 1885.
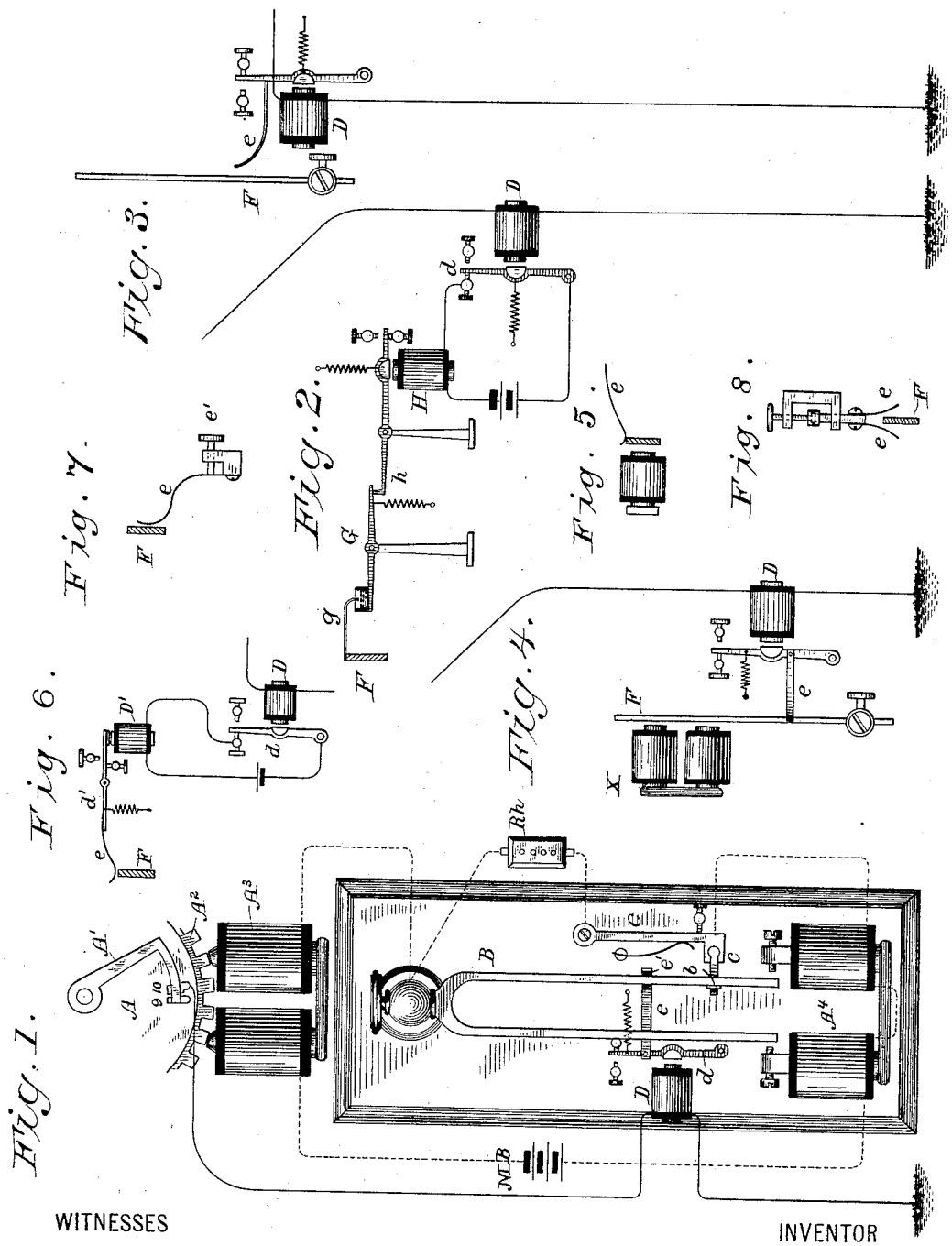
WITNESSES
Ed. A. Newman
Al. C. Newman
INVENTOR
PATRICK B. DELANY,
By his Attorneys
Baldwin, Hopkins & Peyton

UNITED STATES PATENT OFFICE.

PATRICK B. DELANY, OF NEW YORK, N. Y., ASSIGNOR TO THE STANDARD MULTIPLEX TELEGRAPH COMPANY, OF SAME PLACE.

MEANS FOR MECHANICALLY CORRECTING THE VIBRATIONS OF REEDS AND FORKS.

SPECIFICATION forming part of Letters Patent No. 322,695, dated July 21, 1885.

Application filed April 23, 1885. (No model.)

*To all whom it may concern:*

Be it known that I, PATRICK B. DELANY, of New York city, State of New York, have invented certain new and useful Means for Correcting and Controlling the Vibrations of Reeds, Forks, &c., of which the following is a specification.

In various Letters Patent of the United States granted to me October 9, 1884, and in several pending applications, I have shown and described means for correcting and controlling the speed of vibrating reeds and forks by acting upon them magnetically.

The object of my present invention is to effect a mechanical correction and control of the speed of vibrators.

In the accompanying drawings, Figures 1, 2, 3, 4, 5, 6, 7, and 8 are detail partly diagrammatic views illustrating several preferred ways of accomplishing mechanical control and correction.

Assuming that the present invention is used in connection with my synchronous movements described in my patents before mentioned, I have illustrated a portion of a table, A, on which insulated contacts are to be arranged. Some of said contacts are utilized for the reception and transmission of electrical impulses of correction to retard or accelerate the controlling-vibrator. The contacts are traversed by a rotary circuit-completer, A', fast on the spindle of the toothed armature-disk $A^2$, which is actuated by a motor-magnet, $A^3$.

The operation of all these devices is thoroughly described in my patents mentioned, and specific illustration is here unnecessary.

The battery M B is in this instance shown as connected through the coils of the motor-magnet $A^3$, thence to the heel of the vibrating fork B, having reference to Fig. 1, through the fork, the platinum contact $b$ carried thereby, contact-finger $c$, carried on an adjustable arm, C, and coils of the vibrator-magnet $A^4$ to the opposite pole of the battery. An impulse of vibration having been imparted to the fork, it will therefore be continuously vibrated, the circuit being made and broken at the contacts $b\ c$. The armature-disk $A^2$ will in like manner be continuously rotated, an initial impulse of rotation having been imparted to it. An ordinary resistance, R $h$, is placed in a shunt around the contacts $c\ b$ to prevent sparking.

When an impulse of electricity for the correction of the vibrator, which corrects the speed of rotation of the controlling circuit-completer, as fully described in my patents, is received, it will pass, say, from the contact numbered 10 on the table A through the coils of a relay, D, to earth. The armature $d$ of this relay carries a light spring-finger, $e$, the bent end $e'$ of which normally is in proximity to the vibrating tine of the fork, but not in contact therewith. When said correcting impulse is received, the relay-armature $d$ is attracted and the light end of the finger $e$ is momentarily drawn against the tine of the fork. While the effect of this is doubtless to produce a momentary decrease in the amplitude of vibration, a momentary acceleration in the rate takes place.

Instead of the arrangement just described, I may employ that shown in Fig. 3, in which the speed of a vibrating reed, F, may be corrected by a light spring-finger, $e$, carried on the relay-armature $d$. In this case the bent end of the finger $e$ is pushed against the side of the vibrator instead of drawn against it, as in Fig. 1. Of course the operations are identical. Or I may permit the finger $e$ to normally rest lightly against the upper or lower edge of the vibrator, as in Figs. 4 and 5. The effect of such an arrangement is to give the vibrator a normally accelerated speed. When, therefore, the correcting impulse is received, and the finger $e$ is drawn out of contact with the vibrator, then the vibrator will vibrate with increased amplitude, but with slower rate, thus giving the necessary correction to the speed of the apparatus. In this figure X represents the ordinary magnet for actuating the vibrator; or such an arrangement as that shown in Fig. 6 may be employed. There the finger $e$ is carried by an armature, $d'$, in such position that it is normally just out of contact with the top of the vibrator. The armature $d'$ is held in this position against the force of its spring by the magnet D', the circuit of which is normally closed through armature $d$ of relay D and its back stop. When a correcting impulse is received, the finger $e$ touches the top of the vibrator and causes an acceleration of its rate of vibration; or, a light contact-finger carried by the vibrator may be thrown into or out of contact with some correcting medium to effect the correction of the vibrator. In Fig. 2 I have shown a light finger, $g$, carried by the vibrator. This finger projects into an open cup containing mercury or oil or any fluid or suitable material. This cup is carried by a pivoted lever, G, a spring connected with which tends to draw the cup toward the contact on the vibrator.

A post, $h$, on the armature of a magnet, H, the local circuit of which is normally closed at the back contact of the main correcting-relay D, normally presses up the end of the lever not carrying the cup, so that the finger on the vibrator will not come in contact with the material in the cup. When a correcting impulse of electricity is received, the relay-armature $d$ is drawn toward its front contact, the circuit of the magnet H is opened, and the cup is thrown up and its contents brought in contact with the finger on the vibrator. This produces a mechanical correction of the vibrator, causing an acceleration of rate, as in the other cases. Of course by the application of the same principle the normal rate of vibration of a reed or fork may be controlled by the operator. For instance, in Fig. 7, a light spring-finger, $e$, capable of adjustment toward or from the vibrator by means of a set-screw, $e'$, may be used to control or regulate the normal rate of vibration; or, as in Fig. 8, I may use two fingers, $e$, arranged in V shape, so as to straddle the vibrator, and having an adjusting-screw, by which they can be adjusted relatively to the vibrator.

For convenience I have only shown local correcting-circuits in Figs. 2 and 6. It is preferable to use locals except, perhaps, on very short circuits.

My invention contemplates broadly the use of devices for mechanically effecting the correction or adjustment of rate of vibration of reeds, forks, &c. Further illustration of specific arrangements for accomplishing this purpose are deemed unnecessary.

I claim as my invention—

1. The combination, substantially as set forth, of a continuously-automatically-actuated vibrator, means for continuously actuating it, and a device for mechanically correcting or controlling its rate of vibration.

2. The combination, substantially as set forth, of the vibrator, the correcting-relay, its armature, and the elastic finger for mechanically correcting the vibrator.

3. The combination, substantially as set forth, of the table of contacts, the synchronously actuated circuit-completer, the correcting-contacts, a vibrator, and a device for mechanically correcting the speed of the vibrator.

In testimony whereof I have hereunto subscribed my name.

PATRICK B. DELANY.

Witnesses:
GEORGE H. WIRTH,
WENDELL GOODWIN.